(12) United States Patent
Yokoyama

(10) Patent No.: US 7,894,127 B2
(45) Date of Patent: Feb. 22, 2011

(54) OPTICAL TRANSMISSION SYSTEM AND OPTICAL AMPLIFICATION METHOD USED IN THE SYSTEM

(75) Inventor: Ryu Yokoyama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 12/540,507

(22) Filed: Aug. 13, 2009

(65) Prior Publication Data
US 2009/0296198 A1    Dec. 3, 2009

Related U.S. Application Data

(62) Division of application No. 10/633,927, filed on Aug. 4, 2003, now Pat. No. 7,688,501.

(30) Foreign Application Priority Data
Aug. 2, 2002    (JP)    ............... 2002-226150

(51) Int. Cl.
*H01S 3/00*    (2006.01)
(52) U.S. Cl. .................... 359/334; 359/341.3
(58) Field of Classification Search .............. 359/341.3, 359/334
See application file for complete search history.

(56) References Cited

U.S. PATENT DOCUMENTS

2002/0167719 A1* 11/2002 Pedersen et al. ......... 359/341.3
2003/0214701 A1* 11/2003 Hempstead .............. 359/341.3

* cited by examiner

*Primary Examiner*—Mark Hellner
(74) *Attorney, Agent, or Firm*—Ostrolenk Faber LLP

(57) ABSTRACT

At an optical transmission system that uses plural light sources for Raman amplification, even when a failure occurred in a pumping light source in one of the light sources for Raman amplification, the signal light output level and its wavelength characteristic are not deteriorated at the final stage, and the number of components in the system is not made to be large and the cost of the system is not made to be high. This optical transmission system is provided. At an optical transmission system using "n" light sources for Raman amplification, a first to "n−1"th light sources for Raman amplification do not provide spare pumping light sources, and an "n"th light source for Raman amplification provides the spare pumping light sources. When a pumping light source in one of the "n" light sources for Raman amplification had a failure, the spare pumping light source in the "n"th light source for Raman amplification corresponding to the failure occurred pumping light source is worked. With this, the signal light output level and its wavelength characteristic are recovered to a normal state before the failure occurred.

10 Claims, 7 Drawing Sheets

F I G. 3
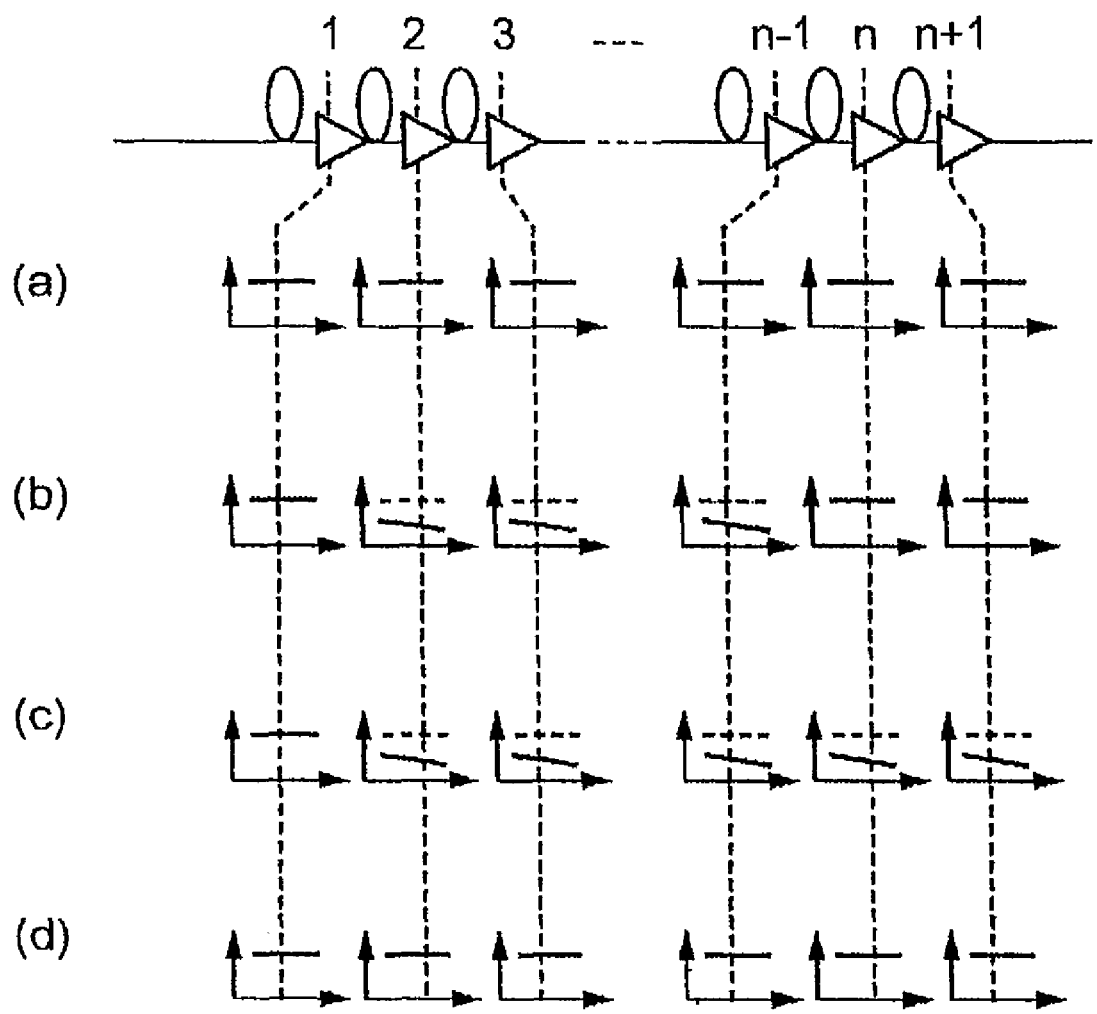

OPTICAL TRANSMISSION SYSTEM AND OPTICAL AMPLIFICATION METHOD USED IN THE SYSTEM

CROSS REFERENCE TO RELATED APPLICATIONS

This application is a divisional of U.S. application Ser. No. 10/633,927 filed Aug. 4, 2003, entitled OPTICAL TRANSMISSION SYSTEM AND OPTICAL AMPLIFICATION METHOD USING IN THE SYSTEM, which claims the benefit of Japan Application Serial No. 2002-226150 filed Aug. 2, 2002, the contents of which are incorporated by this reference.

BACKGROUND OF THE INVENTION

The present invention relates to an optical transmission system and an optical amplification method used in the optical transmission system, in particular, in which the Raman amplification technology for amplifying signal light is used.

DESCRIPTION OF THE RELATED ART

In optical transmission technology, Raman amplification technology, in which Raman scattering is generated in an optical transmission line by using the optical transmission line as its own amplification medium and signal light is directly amplified, is well known. In Raman amplification technology, the Raman amplification phenomenon, in which a gain having a peak is generated at about 100 nm long wavelength side from the wavelength of a pumping light source, is used. In this Raman amplification technology, a gain wavelength is decided by the wavelength of the pumping light source. Therefore, in the optical signal transmission system using the wavelength division multiplexing (WDM) system, a design method, which keeps the signal light in a flat state by combining pumping light sources of plural wavelengths, has been generally used. This technology has been reported at the 2001 Communications Society Conference B-10-66 of The Institute of Electronics, Information and Communication Engineers. Consequently, when a pumping light source has a failure, it is necessary to have a means to compensate for the change of the gain wavelength characteristic.

In Raman amplification technology, the gain is decided by the pumping intensity, and the self healing phenomenon, in which the gain is recovered after several repeats at amplifiers using an erbium doped fiber (EDF), is not generated. In order to solve this problem, there are several methods. In one method, a pumping light source for redundancy is provided in each of the light sources for Raman amplification. In another method, the pumping light intensity is compensated for by allocating the pumping light intensity to the several light sources for Raman amplification disposed after the pumping light source of a light source for Raman amplification has a failure. These methods have been reported in the 2001 Communications Society Conference B-10-62 of The Institute of Electronics, Information and Communication Engineers.

However, in the event that a pumping light source for redundancy is provided in all of the light sources for Raman amplification, there is a problem in that the cost of the optical transmission system is increased. In the event that a pumping light source has a failure, when the pumping light intensity is compensated for by the plural light sources for Raman amplification disposed after the light source that has a failure, there is a problem in that each of the pumping light sources must have excess pumping light intensity, an ability that is not used in the normal state.

SUMMARY OF THE INVENTION

It is therefore an object of the present invention to provide an optical transmission system and an optical amplification method using in the system, in which the number of pumping light sources for redundancy is decreased and the maximum output level ability of each of pumping light sources is made to be low.

According to a first aspect of the present invention, for achieving the object mentioned above, there is provided an optical transmission system. The optical transmission system provides one or more first light sources for Raman amplification that amplify signal light transmitting in an optical transmission line, and one or more second light sources for Raman amplification that are disposed at the positions adjoining the one or more first light sources for Raman amplification via the optical transmission line. And each of the one or more first light sources for Raman amplification provides a first pumping light source that emits first pumping light at a normal time as a pumping light source, and a first optical multiplexer that inputs the first pumping light to the optical transmission line. And each of the one or more second light sources for Raman amplification provides a second pumping light source that emits second pumping light of the same wavelength band of the first pumping light at a normal time as a pumping light source, a spare pumping light source that emits spare pumping light of the same wavelength band of the first pumping light based on necessity, an optical coupler that couples the second pumping light and the spare pumping light, and a second optical multiplexer that inputs the coupled pumping light to the optical transmission line. And in case that a failure occurred at the first or second pumping light source, the spare pumping light source is worked and the spare pumping light is emitted.

According to a second aspect of the present invention, there is provided an optical transmission system. The optical transmission system provides one or more first light sources for Raman amplification that amplify signal light transmitting in an optical transmission line, and one or more second light sources for Raman amplification that are disposed at the positions adjoining the one or more first light sources for Raman amplification via the optical transmission line. And each of the one or more first light sources for Raman amplification provides plural first pumping light sources that emit plural first pumping light whose wavelengths are different from each other at a normal time, as pumping light sources, a first optical multiplexer that multiplexes the plural first pumping light, and a second optical multiplexer that inputs the multiplxed first pumping light to the optical transmission line. And each of the one or more second light sources for Raman amplification provides plural second pumping light sources that emit plural second pumping light whose wavelengths are the same ones corresponding to the plural first pumping light sources at a normal time, as pumping light sources, plural spare pumping light sources that emit plural spare pumping light whose wavelengths are the same ones corresponding to the plural second pumping light sources based on necessity, plural optical couplers that couple the second pumping light and the spare pumping light of the same wavelength band, a third optical multiplexer that multiplexes plural coupled pumping light whose wavelengths are different from each other, and a fourth optical multiplexer that inputs multiplexed pumping light to the optical transmission line. And in case that a failure occurred at one in the plural first or plural second pumping light sources, the spare pumping light source whose wavelength band is the same one that the failure occurred is worked and the spare pumping light is emitted.

According to a third aspect of the present invention, in the first aspect, in case that a failure occurred at the first or second pumping light source, the spare pumping light is emitted from the spare pumping light source so that the output level of the signal light becomes the same output level before the failure occurred.

According to a fourth aspect of the present invention, in the second aspect, in case that a failure occurred at one in the plural first or plural second pumping light sources, the spare pumping light is emitted from corresponding one of the plural spare pumping light sources so that the output level of the signal light becomes the same output level before the failure occurred.

According to a fifth aspect of the present invention, in the first aspect, in case that a failure occurred at the first or second pumping light source, the spare pumping light is emitted from the spare pumping light source so that the gain wavelength characteristic of the signal light becomes the same gain wavelength characteristic before the failure occurred.

According to a sixth aspect of the present invention, in the second aspect, in case that a failure occurred at one in the plural first or plural second pumping light sources, the spare pumping light is emitted from corresponding one of the plural spare pumping light sources so that the gain wavelength characteristic of the signal light becomes the same gain wavelength characteristic before the failure occurred.

According to a seventh aspect of the present invention, in the first aspect, each of the one or more first light sources for Raman amplification further provides a control circuit that controls the first pumping light source. And each of the one or more second light sources for Raman amplification further provides a control circuit that controls the second pumping light source and the spare pumping light source.

According to an eighth aspect of the present invention, in the second aspect, each of the one or more first light sources for Raman amplification further provides a control circuit that controls the plural first pumping light sources. And each of the one or more second light sources for Raman amplification further provides a control circuit that controls the plural second pumping light sources and the plural spare pumping light sources.

According to a ninth aspect of the present invention, there is provided an optical transmission system. The optical transmission system provides one or more light sources for Raman amplification not having a redundancy system that amplify signal light transmitting in plural optical transmission lines, and one or more light sources for Raman amplification having a redundancy system that are disposed at the positions adjoining the one or more light sources for Raman amplification not having the redundancy system via the plural optical transmission lines. And each of the one or more light sources for Raman amplification not having the redundancy system provides plural first pumping light sources that emit first pumping light whose wavelengths are different from each other at a normal time, as pumping light sources, a first means that multiplexes the plural first pumping light and splits mulitplexed pumping light into plural pumping light, and plural first optical multiplexers that input split pumping light to the plural optical transmission lines. And each of the one or more light sources for Raman amplification having the redundancy system provides plural second pumping light sources that emit second pumping light whose wavelengths are the same ones of the plural first pumping light sources at a normal time, as pumping light sources, plural spare pumping light sources that emit spare pumping light whose wavelength bands are the same ones corresponding to the plural first pumping light sources, based on necessity, plural optical couplers that couple the second pumping light and the spare pumping light of the same wavelength band, a second means that multiplexes plural coupled pumping light whose wavelengths are different from each other and splits mulitplexed pumping light into plural pumping light, and plural second optical multiplexers that input split pumping light to the plural optical transmission lines. And in case that a failure occurred at one in the plural first pumping light sources in the one or more light sources for Raman amplification not having the redundancy system or at one in the plural second pumping light sources in the light sources for Raman amplification having the redundancy system, the spare pumping light source whose wavelength band is the same one that the failure occurred is worked and the spare pumping light is emitted.

According to a tenth aspect of the present invention, there is provided an optical transmission system. The optical transmission system provides one or more light sources for Raman amplification not having a redundancy system that amplify signal light transmitting in plural optical transmission lines, and one or more light sources for Raman amplification having a redundancy system that are disposed at the positions adjoining the one or more light sources for Raman amplification not having the redundancy system via the plural optical transmission lines. And each of the one or more light sources for Raman amplification not having the redundancy system provides plural first pumping light sources that emit first pumping light whose wavelengths are different from each other at a normal time, as pumping light sources, a first means that multiplexes the plural first pumping light and splits mulitplexed pumping light into plural pumping light, and plural first optical multiplexers that input split pumping light to the plural optical transmission lines. And each of the one or more light sources for Raman amplification having the redundancy system provides plural second pumping light sources that emit second pumping light whose wavelengths are the same ones of the plural first pumping light sources at a normal time, as pumping light sources, plural spare pumping light sources that emit spare pumping light whose wavelength bands are the same ones corresponding to the plural first pumping light sources, based on necessity, plural optical multiplexers that multiplex the second pumping light having different wavelengths in one of the plural optical multiplexers and multiplex the spare pumping light having different wavelengths in other of the plural optical multiplexers, a second means that multiplexes plural multiplexed pumping light whose wavelengths are different from each other and splits mulitplexed pumping light into plural pumping light, and plural second optical multiplexers that input split pumping light to the plural optical transmission lines. And in case that a failure occurred at one in the plural first pumping light sources in the one or more light sources for Raman amplification not having the redundancy system or at one in the plural second pumping light sources in the light sources for Raman amplification having the redundancy system, the spare pumping light source whose wavelength band is the same one that the failure occurred is worked and the spare pumping light is emitted.

According to an eleventh aspect of the present invention, for achieving the object mentioned above, there is provided an optical amplification method in an optical transmission system, in which one or more first light sources for Raman amplification that amplify signal light transmitting in an optical transmission line and one or more second light sources for Raman amplification that are disposed at the positions adjoining the one or more first light sources for Raman amplification via the optical transmission line are provided. The optical amplification method provides the steps of, amplifying the signal light by the one or more first and second light sources for Raman amplification, transmitting the signal light in a deteriorated state of the characteristic of the signal light by that a failure occurred at one of the pumping light sources in the one or more first and second light sources for Raman amplification, detecting the deterioration state of the characteristic of the signal light by one of the second light sources for Raman amplification, and recovering the deteriorated state of the characteristic of the signal light to a normal state before deteriorated by emitting spare pumping light from a spare pumping light source disposed in one of the second light sources for Raman amplification.

According to a twelfth aspect of the present invention, in the eleventh aspect, in case that a failure occurred at one of the pumping light sources, the spare pumping light is emitted from the spare pumping light source so that the output level of the signal light becomes the same output level before the failure occurred.

According to a thirteenth aspect of the present invention, in the eleventh aspect, in case that a failure occurred at one of the pumping light sources, the spare pumping light is emitted from the spare pumping light source so that the gain wavelength characteristic of the signal light becomes the same gain wavelength characteristic before the failure occurred.

According to a fourteenth aspect of the present invention, in the eleventh aspect, plural pumping light sources emitting plural pumping light of plural wavelengths are used as the pumping light source, and plural spare pumping light sources emitting plural spare pumping light of plural wavelengths corresponding to the plural pumping light sources are used as the spare pumping light source.

According to a fifteenth aspect of the present invention, in the eleventh aspect, outputs from the pumping light source and the spare pumping light source are controlled by respective control circuits in the one or more first and second light sources for Raman amplification.

BRIEF DESCRIPTION OF THE DRAWINGS

The objects and features of the present invention will become more apparent from the consideration of the following detailed description taken in conjunction with the accompanying drawings in which:

FIG. 3 is diagrams showing signal light output wavelength characteristics in each span between the light sources for Raman amplification in the various optical transmission systems;

DESCRIPTION OF THE PREFERRED EMBODIMENTS

Figure 1:
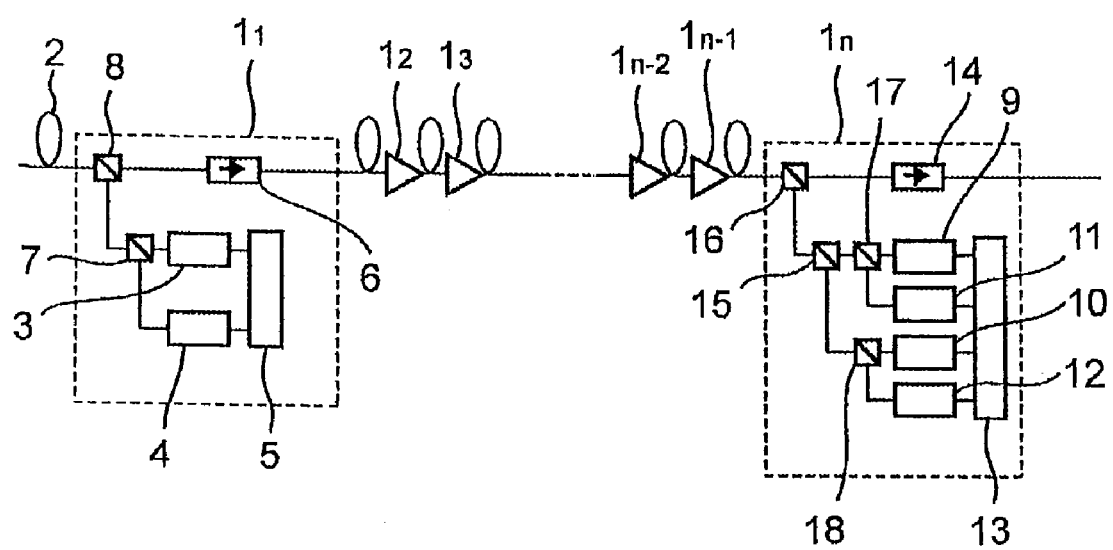
FIG. 1 is a block diagram showing a structure of an optical transmission system of a first embodiment of the present invention.

Referring now to the drawings, embodiments of the present invention are explained in detail. First, a first embodiment of the present invention is explained. FIG. 1 is a block diagram showing a structure of an optical transmission system of the first embodiment of the present invention. In the first embodiment of the present invention, two pumping light sources whose wavelengths are different from each other are used.

As shown in FIG. 1, a light source for Raman amplification $1_1$ includes a pumping light source 3 for emitting pumping light having wavelength $\lambda 1$, a pumping light source 4 for emitting pumping light having wavelength $\lambda 2$, an optical multiplexer 7 that multiplexes the emitted pumping light having wavelengths of $\lambda 1$ and $\lambda 2$, an optical multiplexer 8 that inputs the multiplexed pumping light to an optical transmission line 2, a control circuit 5 for controlling the pumping light sources 3 and 4, and an optical isolator 6.

In this embodiment, each of the light sources for Raman amplification $1_2$ to $1_{n-1}$ has the same structure as the light source for Raman amplification $1_1$ has. Each of these light sources for Raman amplification $1_1$ to $1_{n-1}$ does not have spare pumping light sources for redundancy. In this description, "n" is an integer equal to two or more. However, an "n"th light source for Raman amplification $1_n$ has spare pumping light sources 11 and 12 for redundancy. The spare pumping light source 11 is provided for redundancy to a pumping light source 9 and the spare pumping light source 12 is provided for redundancy to a pumping light source 10. An optical coupler 17 couples the pumping light from the pumping light source 9 and the spare pumping light source 11. An optical coupler 18 couples the pumping light from the pumping light source 10 and the spare pumping light source 12. For the optical couplers 17 and 18, polarized wave couplers are used.

In the light source for Raman amplification $1_n$, the pumping light source 9 emits the pumping light of the same wavelength as the pumping light source 3 emits, and the pumping light source 10 emits the pumping light of the same wavelength as the pumping light source 4 emits. In addition, the spare pumping light source 11 emits the pumping light of the same wavelength as the pumping light source 3 emits, and the spare pumping light source 12 emits the pumping light of the same wavelength as the pumping light source 4 emits.

In the light source for Raman amplification $1_n$, the pumping light sources 9 and 10, and the spare pumping light sources 11 and 12 are controlled by a control circuit 13. Feedback is applied to these pumping light sources 9 and 10 and the spare pumping light sources 11 and 12 corresponding to the characteristics of signal light detected by a monitor (not shown) disposed at the optical transmission line 2. The spare pumping light sources 11 and 12 do not work during the normal operation of the pumping light sources and when any failure is not detected in the signal light. However, when the deterioration of the signal light is detected, caused by generating an abnormal state such as lowering the output power in any of the pumping light sources, the spare pumping light sources 11 and/or 12 is worked by the control circuit 13.

In the light source for Raman amplification $1_n$, an optical multiplexer 15 multiplexes the pumping light outputted from the optical couplers 17 and 18, and an optical multiplexer 16 inputs the pumping light multiplexed at the optical multiplexers 15 to the optical transmission line 2. In addition, an optical isolator 14 is provided in the light source for Raman amplification $1_n$.

Next, operation of the first embodiment of the present invention is explained. For example, in case a failure occurs at the pumping light source 4 in the first light source for Raman amplification $1_1$, signal light is transmitted from the first light source for Raman amplification $1_1$ onward in a state that the signal light output level and its wavelength characteristic are abnormal. However, by making the spare pumping light source 12 in the "n"th light source for Raman amplification $1_n$ work, the deterioration caused by the pumping light source 4 is corrected, and the normal signal light output level and the normal wavelength characteristic can be recovered.

Figure 2:
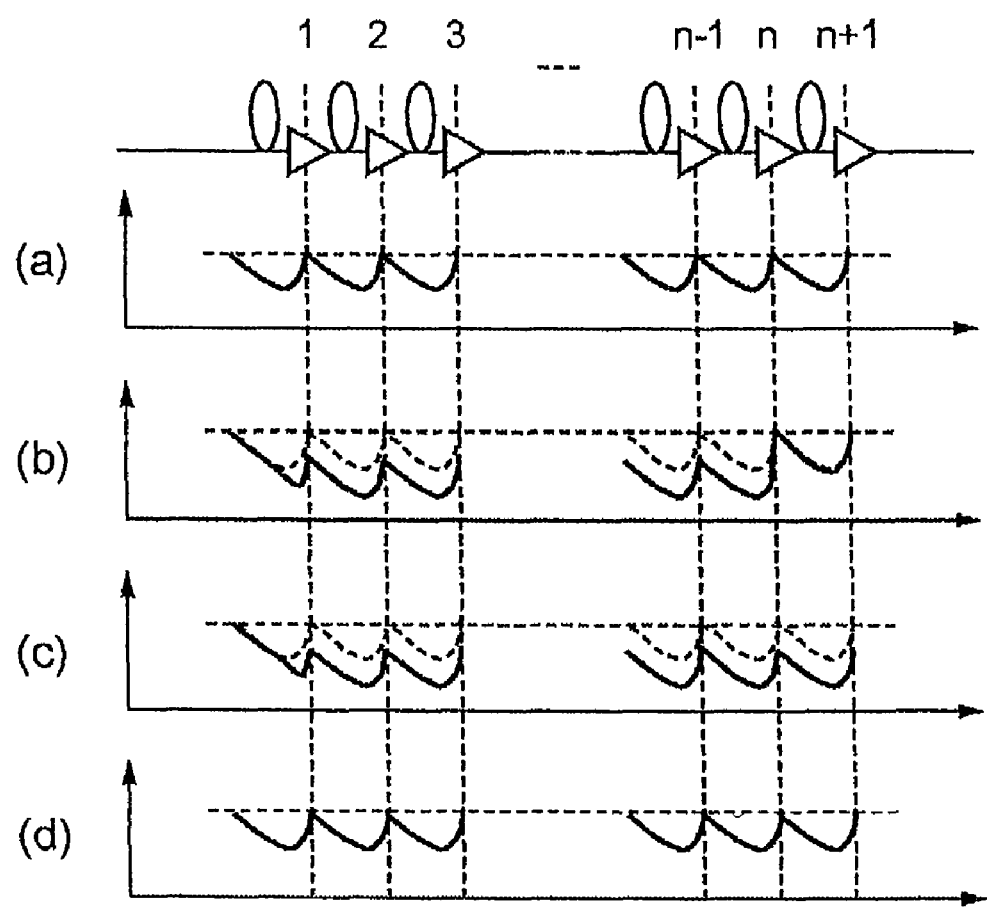
FIG. 2 is output level diagrams of transmitting signal light in various optical transmission systems.

Referring to FIGS. 2 and 3, this operation is explained in more detail. FIG. 2 shows output level diagrams of transmitting signal light in various optical transmission systems. In FIG. 2, a continuous line shows an actual output level and a dotted line shows a normal output level, and plural light sources for Raman amplification 1 to n+1 are shown. FIG. 3 depicts diagrams showing signal light output wavelength characteristics in each span between the light sources for Raman amplification 1 to n+1 in various optical transmission systems. In FIG. 3, a horizontal line shows a normal signal light output wavelength characteristic and a slanted line shows a changed signal light output wavelength characteristic.

In FIGS. 2 and 3, (a) shows a case in which the pumping light sources in all the light sources for Raman amplification in an optical transmission system are working in a designated normal output level. FIGS. 2(b) and 3(b) show the optical transmission system of the present invention in which spare pumping light sources are disposed in the "n"th light source for Raman amplification, FIGS. 2(c) and 3(c) show an optical transmission system, in which spare pumping light sources are not provided, and FIGS. 2(d) and 3(d) show an optical transmission system, in which spare pumping light sources are provided in all the light sources for Raman amplification.

FIGS. 2(b), (c), and (d) and 3(b), (c), and (d) show cases in which a failure occurred in a pumping light source in the second light source for Raman amplification being the second repeater.

In FIGS. 2(b) and 3(b) of the present invention, a case, in which a pumping light source of wavelength λ2 in the second light source for Raman amplification had a failure, is explained. In this case, signal light is transmitted from the second light source for Raman amplification onward in a state that the signal light output level and its wavelength characteristic are abnormal. However, by making a spare pumping light source of the same wavelength λ2 in the "n"th light source for Raman amplification work, the deterioration caused by the pumping light source in the second light source for Raman amplification is corrected, and the normal signal light output level and the normal wavelength characteristic can be recovered.

In FIGS. 2(c) and 3(c), since the optical transmission system does not provide any spare pumping light sources, as shown in FIGS. 2(c) and 3(c), from the second light source for Raman amplification onward, the signal light output level and its wavelength characteristic remain in the deteriorated levels.

In FIGS. 2(d) and 3(d), since the spare pumping light sources are provided in the second light source for Raman amplification in which a failure occurred, as shown in FIGS. 2(d) and 3(d), the signal light output level and its wavelength characteristic are not changed in all the light sources for Raman amplification.

When the cases shown in FIGS. 2(b) and (d) and 3(b) and (d) are compared, although the signal light output level and the wavelength characteristic, which are obtained finally, are the same, the necessary number of the spare pumping light sources is different. That is, the number of the spare pumping light sources in the present invention in the case shown in FIGS. 2(b) and 3(b) can be 1/n of that of the case shown in FIGS. 2(d) and 3(d) of the conventional technology. As mentioned above, the present invention is especially effective in an optical transmission system, in which the light sources for Raman amplification combining plural pumping wavelengths are used for realizing particularly flat gain wavelength characteristics.

In the present invention, a case, in which two wavelengths are used for the pumping light sources, is explained. However, the number of the wavelengths is not limited to two, and three or more wavelengths can be used, and the deterioration occurring in the signal light can be corrected to a normal state, by an operation similar to that mentioned above.

In an optical transmission system not providing any spare pumping light source, when one or more pumping light sources had failures, it is said that the optical transmission system had a failure.

Next, equations for calculating a failure rate of the optical transmission system of the present invention are explained.

For the calculation of the failure rate, an optical transmission system composed of a total of N light sources for Raman amplification, in which spare pumping light sources for redundancy are provided in the light sources for Raman amplification every "n" repeats, is considered. The failure rate of a pumping light source is defined as F1r, and the failure rate of a spare pumping light source for redundancy is defined as F2r. In this description, N is an integer equal to or larger than "n".

In a case where the spare pumping light sources are provided every "n"th light source for Raman amplification, the failure rate of the total light sources for Raman amplification is the sum of probability "a" and probability "b". The probability "a" is the probability that pumping light sources in two or more light sources for Raman amplification in the "n" light sources for Raman amplification have failures. The probability "b" is the probability that a pumping light source in one light source for Raman amplification in the "n" light sources for Raman amplification has a failure, and also a spare pumping light source has a failure. The probability "a" is shown in the following equation (1) and the probability "b" is shown in the following equation (2).

$$a = nC2 \times F1r^2 + nC3 \times F1r^3 + \ldots + nCn-1 \times F1r^{(n-1)} + nCn \times F1r^n \qquad (1)$$

$$b = nC1 \times F1r \times F2r \qquad (2)$$

In the above equations, nCx represents the number of combinations that extract x pieces from n pieces given by the following equation, and the order of the extraction is free.

$$nCx = n!/x!(n-x)!$$

A value being the sum of the probability (a) and (b) multiplied by N/n becomes the failure rate of the optical transmission system in the case that the spare pumping light sources are provided every "n"th repeater (light source for Raman amplification) in the optical transmission system composed of a total of N repeaters (light sources for Raman amplification). That is, the failure rate Fs of the optical transmission system is given by the following equation (3).

$$Fs = N/n \times (a+b) \qquad (3)$$

Figure 4:
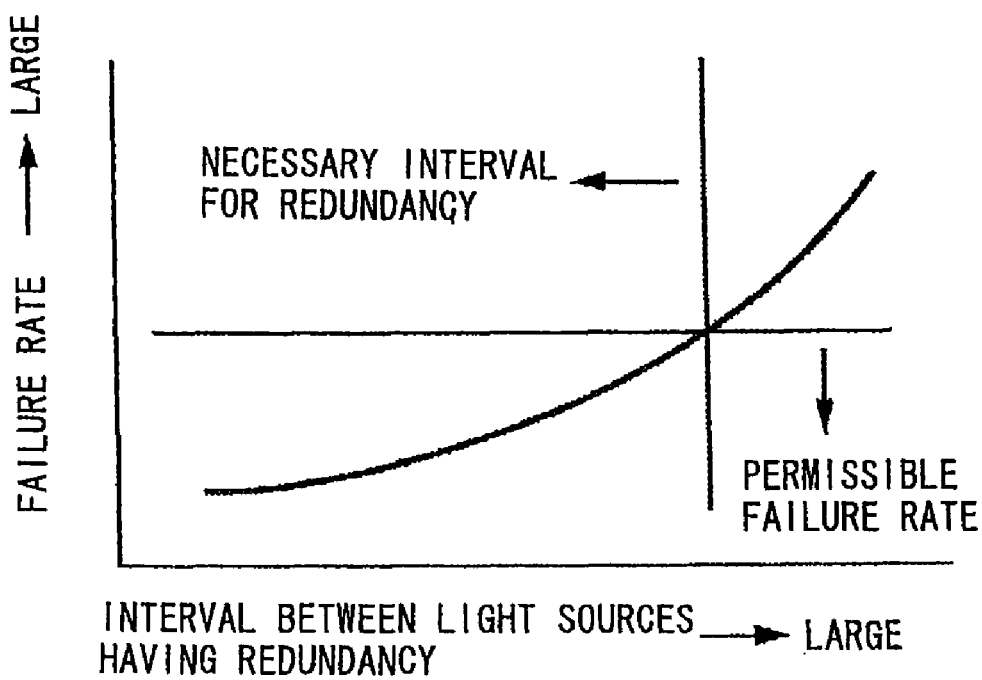
FIG. 4 is a graph showing the relation between the failure rate of the optical transmission system and the interval between the light sources for Raman amplification having the spare pumping light sources for redundancy of the first embodiment of the present invention.

FIG. 4 is a graph showing the relation between the failure rate of the optical transmission system and the interval between the light sources for Raman amplification having the spare pumping light sources for redundancy of the first embodiment of the present invention. As shown in FIG. 4, the necessary interval between the light sources for Raman amplification having the spare pumping light sources for redundancy can be decided by the permissible failure rate of the optical transmission system.

Figure 5:
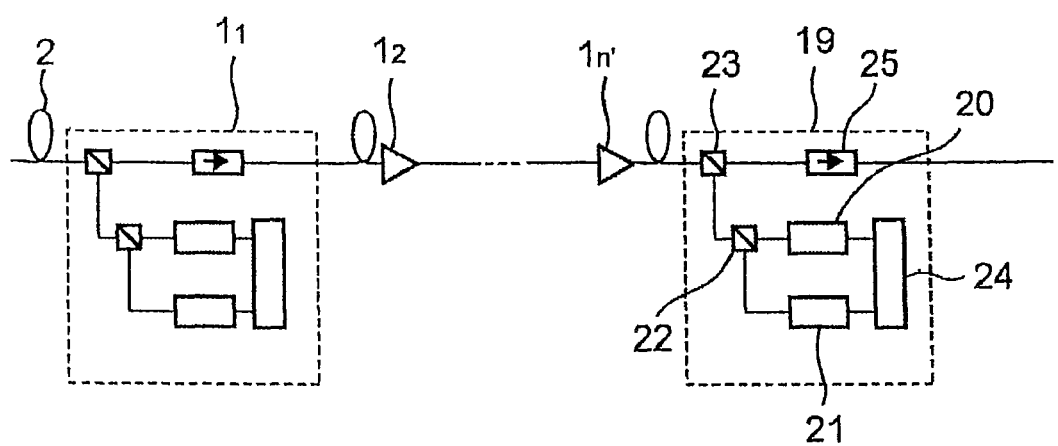
FIG. 5 is a block diagram showing a structure of an optical transmission system of a second embodiment of the present invention.

Next, a second embodiment of the present invention is explained. FIG. 5 is a block diagram showing a structure of an optical transmission system of the second embodiment of the present invention. In the second embodiment of the present invention, the structures of the light sources for Raman amplification $1_1$ to $1_{n-1}$ (not shown) are the same ones as in the first embodiment. Further, the structure of the light source for Raman amplification $1_n$ is the same as that of the light source for Raman amplification $1_1$ and is different from that of the light source for Raman amplification $1_n$ of the first embodiment. That is, for the second embodiment, a light source for Raman amplification 19 specialized only for redundancy is provided additionally. As shown in FIG. 5, the light source for Raman amplification 19 includes spare pumping light sources 20 and 21 for redundancy, an optical multiplexer 22 that multiplexes the pumping light emitted from the spare pumping light sources 20 and 21, an optical multiplexer 23 that inputs the multiplexed pumping light to an optical transmission line 2, a control circuit 24 for controlling the spare pumping light sources 20 and 21, and an optical isolator 25.

In the second embodiment of the present invention, the same effect as the first embodiment can be obtained. In the second embodiment of the present invention, two wavelengths are used for the pumping light sources. However, the number of the wavelengths is not limited to two and three or more wavelengths can be used.

Figure 6:
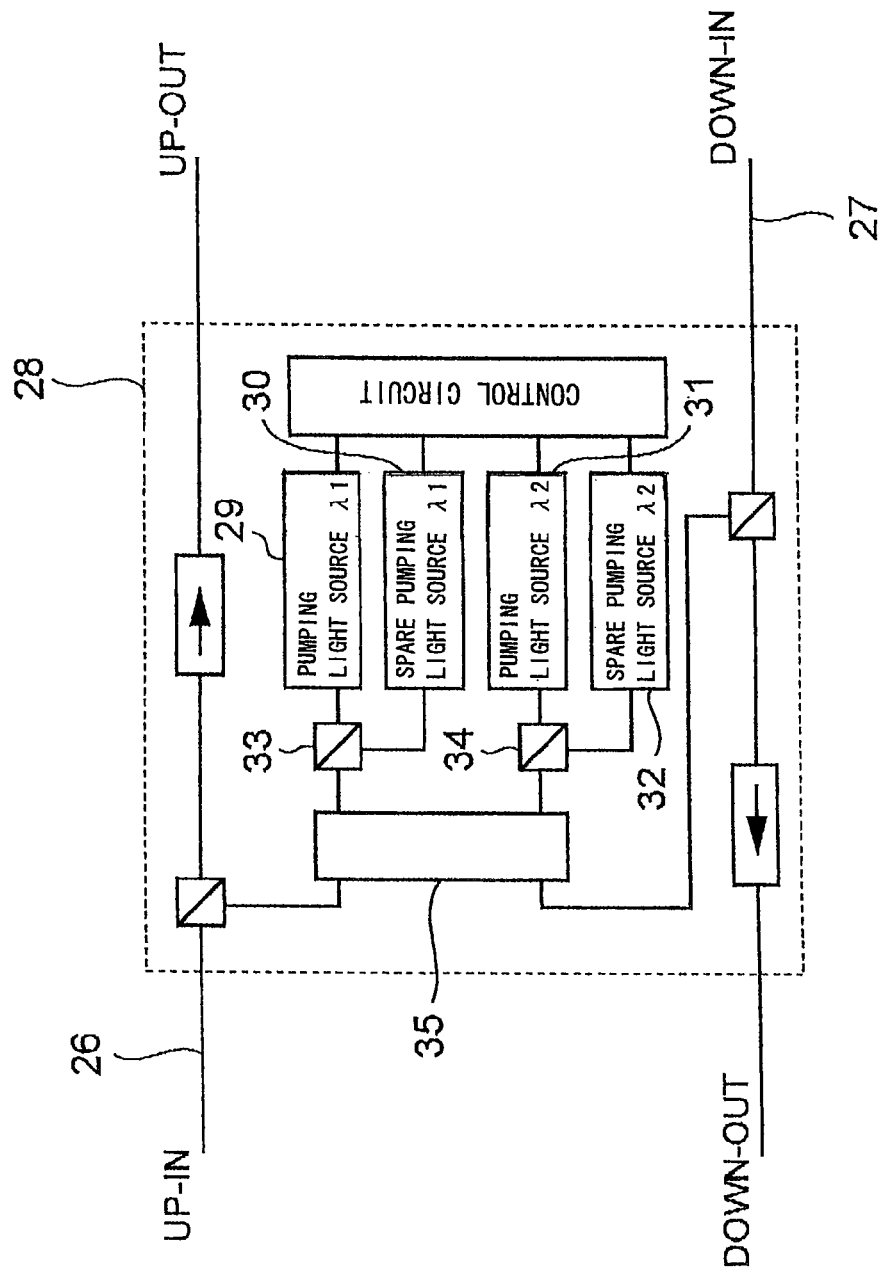
FIG. 6 is a block diagram showing a structure of a light source for Raman amplification used in an optical transmission system of a third embodiment of the present invention.

Next, a third embodiment of the present invention is explained. FIG. 6 is a block diagram showing a structure of a light source for Raman amplification used in an optical transmission system of the third embodiment of the present invention. In the third embodiment of the present invention, a light source for Raman amplification applying to upstream and downstream optical transmission lines is explained.

In FIG. 6, a light source for Raman amplification 28 being common for an upstream optical transmission line 26 and a downstream optical transmission line 27 is provided in the third embodiment of the present invention.

As shown in FIG. 6, the light source for Raman amplification 28 having redundancy provides a pumping light source 29 for emitting pumping light having wavelength λ1, a spare pumping light source 30 for emitting pumping light having wavelength λ1, a pumping light source 31 for emitting pumping light having wavelength λ2, a spare pumping light source 32 for emitting pumping light having wavelength λ2, an optical coupler 33 that couples the pumping light of wavelength λ1 emitted from the pumping light source 29 and the spare pumping light source 30, an optical coupler 34 that couples the pumping light of wavelength λ2 emitted from the pumping light source 31 and the spare pumping light source 32, and an optical multiplexer 35 that multiplexes the pumping light of wavelengths λ1 and λ2 and splits the multiplexed pumping light. The split pumping light is inputted to the upstream and downstream optical transmission lines 26 and 27 respectively via respective optical multiplexers. In FIG. 6, a control circuit and optical isolators are also shown. By using the light source for Raman amplification 28 at the "n"th position in the upstream and downstream optical transmission lines, the same effect as the first embodiment can be obtained in the third embodiment of the present invention. In this embodiment, for the first to "n−1"th positions, light sources for Raman amplification, in which the spare pumping light sources 30 and 31 are not provided in the light sources for Raman amplification, are used.

Figure 7:
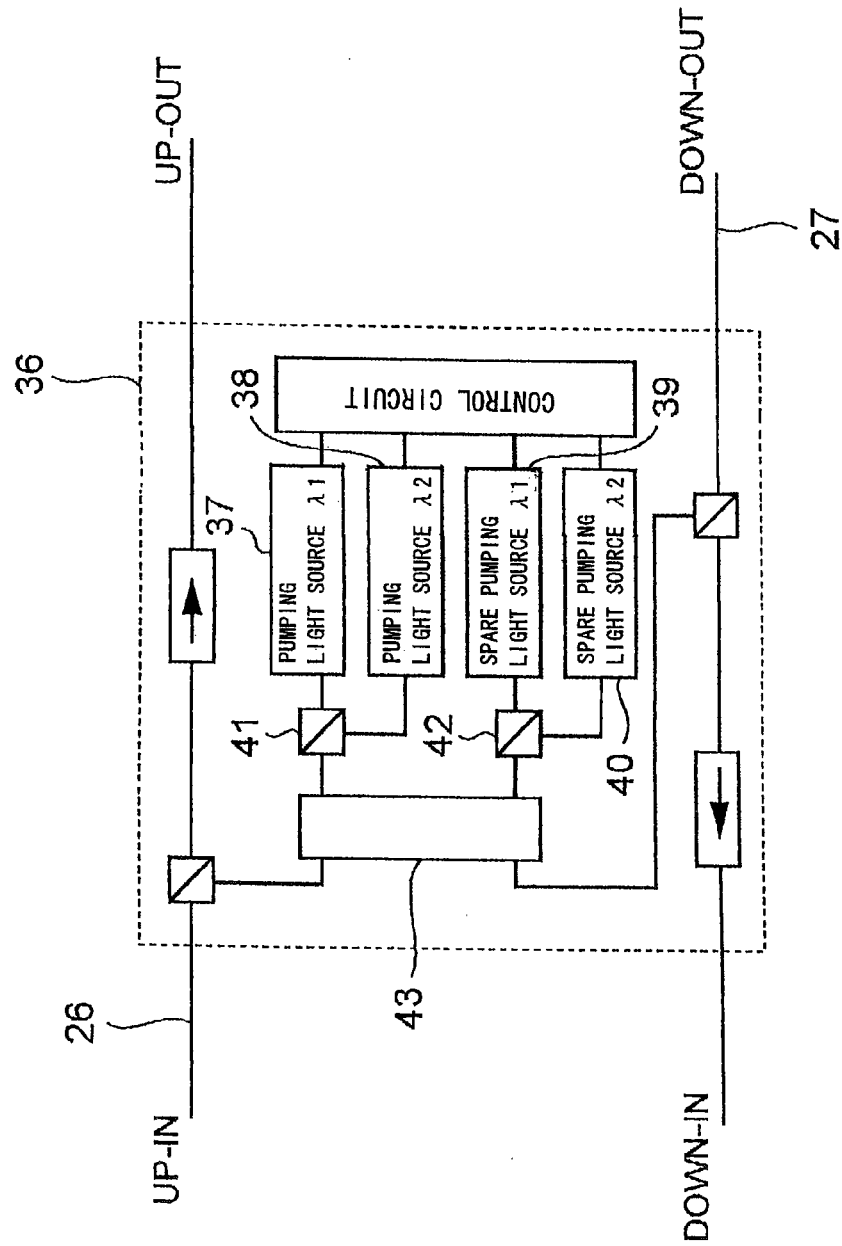
FIG. 7 is a block diagram showing a structure of a light source for Raman amplification used in an optical transmission system of a fourth embodiment of the present invention.

Next, a fourth embodiment of the present invention is explained. FIG. 7 is a block diagram showing a structure of a light source for Raman amplification used in an optical transmission system of the fourth embodiment of the present invention. In the fourth embodiment of the present invention, a light source for Raman amplification applying to upstream and downstream optical transmission lines is the same as in the third embodiment of the present invention.

In FIG. 7, a light source for Raman amplification 36 being common for an upstream optical transmission line 26 and a downstream optical transmission line 27 is provided in the fourth embodiment of the present invention.

As shown in FIG. 7, the light source for Raman amplification 36 having redundancy provides a pumping light source 37 for emitting pumping light having wavelength λ1, a pumping light source 38 for emitting pumping light having wavelength λ2, a spare pumping light source 39 for emitting pumping light having wavelength λ1, a spare pumping light source 40 for emitting pumping light having wavelength λ2, an optical multiplexer 41 that multiplexes the pumping light of wavelengths λ1 and λ2 emitted from the pumping light sources 37 and 38, an optical multiplexer 42 that multiplexes the pumping light of wavelengths λ1 and λ2 emitted from the spare pumping light sources 39 and 40, an optical multiplexer 43 that multiplexes the pumping light from the optical multiplexers 41 and 42 and splits the multiplexed pumping light. The split pumping light is inputted to the upstream optical transmission line 26 and the downstream optical transmission line 27 respectively via respective optical multiplexers. In FIG. 7, a control circuit and optical isolators are also shown. By using the light source for Raman amplification 36 at the "n"th position in the upstream and downstream optical transmission lines, the same effect as the first embodiment can be obtained in the fourth embodiment of the present invention. In this embodiment, at the first to "n−1"th positions, light sources for Raman amplification, in which the spare pumping light sources 39 and 40 are not provided in the light sources for Raman amplification, are used.

As mentioned above, according to the optical transmission system of the embodiments of the present invention, a redundant system (spare pumping light sources) is not provided in each of the light sources for Raman amplification, but one redundant system is provided in one of the plural light sources for Raman amplification. Therefore, the number of components in the optical transmission system can be decreased, and also the cost of manufacturing the optical transmission system can be decreased. Moreover, by the structure mentioned above, even when a failure occurs in a pumping light source, the signal light can be kept at a desirable output level and a desirable wavelength characteristic.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical transmission system, comprising:
   one or more first light sources for Raman amplification that amplify signal light transmitting in an optical transmission line; and one or more second light sources for Raman amplification that are disposed at the positions adjoining said one or more first light sources for Raman amplification via said optical transmission line, wherein:

each of said one or more first light sources for Raman amplification, comprising:

a first pumping light source that emits first pumping light at a normal time as a pumping light source; and a first optical multiplexer that inputs said first pumping light to said optical transmission line, and each of said one or more second light sources for Raman amplification, comprising:

a second pumping light source that emits second pumping light of the same wavelength band of said first pumping light at a normal time as a pumping light source;

a spare pumping light source that emits spare pumping light of the same wavelength band of said first pumping light based on necessity, a number of said first light sources for Raman amplification and a number of said second light sources for Raman amplification being determined by a permissible failure rate of the optical transmission system;

an optical coupler that couples said second pumping light and said spare pumping light; and a second optical multiplexer that inputs said coupled pumping light to said optical transmission line, wherein:

in case that a failure occurred at said first or second pumping light source, said spare pumping light source is worked and said spare pumping light is emitted.

2. An optical transmission system, comprising:

one or more first light sources for Raman amplification that amplify signal light transmitting in an optical transmission line; and one or more second light sources for Raman amplification that are disposed at the positions adjoining said one or more first light sources for Raman amplification via said optical transmission line, wherein:

each of said one or more first light sources for Raman amplification, comprising:

plural first pumping light sources that emit plural first pumping light whose wavelengths are different from each other at a normal time, as pumping light sources;

a first optical multiplexer that multiplexes said plural first pumping light; and a second optical multiplexer that inputs said multiplexed first pumping light to said optical transmission line, and each of said one or more second light sources for Raman amplification, comprising:

plural second pumping light sources that emit plural second pumping light whose wavelengths are the same ones corresponding to said plural first pumping light sources at a normal time, as pumping light sources;

plural spare pumping light sources that emit plural spare pumping light whose wavelengths are the same ones corresponding to said plural second pumping light sources based on necessity, a number of said second light sources not having spare pumping light sources, intervening between two of said second light sources having spare pumping light sources, and being determined by a permissible failure rate of the optical transmission system;

plural optical couplers that couple said second pumping light and said spare pumping light of the same wavelength band;

a third optical multiplexer that multiplexes plural coupled pumping light whose wavelengths are different from each other; and a fourth optical multiplexer that inputs multiplexed pumping light to said optical transmission line, wherein:

in case that a failure occurred at one in said plural first or plural second pumping light sources, said spare pumping light source whose wavelength band is the same one that said failure occurred is worked and said spare pumping light is emitted.

3. An optical transmission system in accordance with claim 1, wherein:

in case that a failure occurred at said first or second pumping light source, said spare pumping light is emitted from said spare pumping light source so that the output level of said signal light becomes the same output level before said failure occurred.

4. An optical transmission system in accordance with claim 2, wherein:

in case that a failure occurred at one in said plural first or plural second pumping light sources, said spare pumping light is emitted from corresponding one of said plural spare pumping light sources so that the output level of said signal light becomes the same output level before said failure occurred.

5. An optical transmission system in accordance with claim 1, wherein:

in case that a failure occurred at said first or second pumping light source, said spare pumping light is emitted from said spare pumping light source so that the gain wavelength characteristic of said signal light becomes the same gain wavelength characteristic before said failure occurred.

6. An optical transmission system in accordance with claim 2, wherein:

in case that a failure occurred at one in said plural first or plural second pumping light sources, said spare pumping light is emitted from corresponding one of said plural spare pumping light sources so that the gain wavelength characteristic of said signal light becomes the same gain wavelength characteristic before said failure occurred.

7. An optical transmission system in accordance with claim 1, wherein:

each of said one or more first light sources for Raman amplification, further comprising:

a control circuit that controls said first pumping light source, and each of said one or more second light sources for Raman amplification, further comprising:

a control circuit that controls said second pumping light source and said spare pumping light source.

8. An optical transmission system in accordance with claim 2, wherein:

each of said one or more first light sources for Raman amplification, further comprising:

a control circuit that controls said plural first pumping light sources, and each of said one or more second light sources for Raman amplification, further comprising:

a control circuit that controls said plural second pumping light sources and said plural spare pumping light sources.

9. An optical transmission system, comprising:

one or more light sources for Raman amplification not having a redundancy system that amplify signal light transmitting in plural optical transmission lines; and one or more light sources for Raman amplification having a redundancy system that are disposed at the positions adjoining said one or more light sources for Raman amplification not having said redundancy system via said plural optical transmission lines, wherein:

each of said one or more light sources for Raman amplification not having said redundancy system, comprising:

plural first pumping light sources that emit first pumping light whose wavelengths are different from each other at a normal time, as pumping light sources;

a first means that multiplexes said plural first pumping light and splits multiplexed pumping light into plural pumping light; and plural first optical multiplexers that input split pumping light to said plural optical transmission lines, and each of said one or more light sources for Raman amplification having said redundancy system, comprising:

plural second pumping light sources that emit second pumping light whose wavelengths are the same ones of said plural first pumping light sources at a normal time, as pumping light sources;

plural spare pumping light sources that emit spare pumping light whose wavelength bands are the same ones corresponding to said plural first pumping light sources, based on necessity, a number of said second light sources not having spare pumping light sources, intervening between two of said second light sources having spare pumping light sources, and being determined by a permissible failure rate of the optical transmission system;

plural optical couplers that couple said second pumping light and said spare pumping light of the same wavelength band;

a second means that multiplexes plural coupled pumping light whose wavelengths are different from each other and splits mulitplexed pumping light into plural pumping light; and plural second optical multiplexers that input split pumping light to said plural optical transmission lines, wherein:

in case that a failure occurred at one in said plural first pumping light sources in said one or more light sources for Raman amplification not having said redundancy system or at one in said plural second pumping light sources in said light sources for Raman amplification having said redundancy system, said spare pumping light source whose wavelength band is the same one that said failure occurred is worked and said spare pumping light is emitted.

10. An optical transmission system, comprising:

one or more light sources for Raman amplification not having a redundancy system that amplify signal light transmitting in plural optical transmission lines; and one or more light sources for Raman amplification having a redundancy system that are disposed at the positions adjoining said one or more light sources for Raman amplification not having said redundancy system via said plural optical transmission lines, wherein:

each of said one or more light sources for Raman amplification not having said redundancy system, comprising:

plural first pumping light sources that emit first pumping light whose wavelengths are different from each other at a normal time, as pumping light sources;

a first means that multiplexes said plural first pumping light and splits mulitplexed pumping light into plural pumping light; and plural first optical multiplexers that input split pumping light to said plural optical transmission lines, and each of said one or more light sources for Raman amplification having said redundancy system, comprising:

plural second pumping light sources that emit second pumping light whose wavelengths are the same ones of said plural first pumping light sources at a normal time, as pumping light sources;

plural spare pumping light sources that emit spare pumping light whose wavelength bands are the same ones corresponding to said plural first pumping light sources, based on necessity, a number of said second light sources not having spare pumping light sources, intervening between two of said second light sources having spare pumping light sources, and being determined by a permissible failure rate of the optical transmission system;

plural optical multiplexers that multiplex said second pumping light having different wavelengths in one of said plural optical multiplexers and multiplex said spare pumping light having different wavelengths in other of said plural optical multiplexers;

a second means that multiplexes plural multiplexed pumping light whose wavelengths are different from each other and splits mulitplexed pumping light into plural pumping light; and plural second optical multiplexers that input split pumping light to said plural optical transmission lines, wherein:

in case that a failure occurred at one in said plural first pumping light sources in said one or more light sources for Raman amplification not having said redundancy system or at one in said plural second pumping light sources in said light sources for Raman amplification having said redundancy system, said spare pumping light source whose wavelength band is the same one that said failure occurred is worked and said spare pumping light is emitted.

* * * * *